F. HARRIS.
CULTIVATOR.
APPLICATION FILED AUG. 16, 1911.
1,094,437.
Patented Apr. 28, 1914.
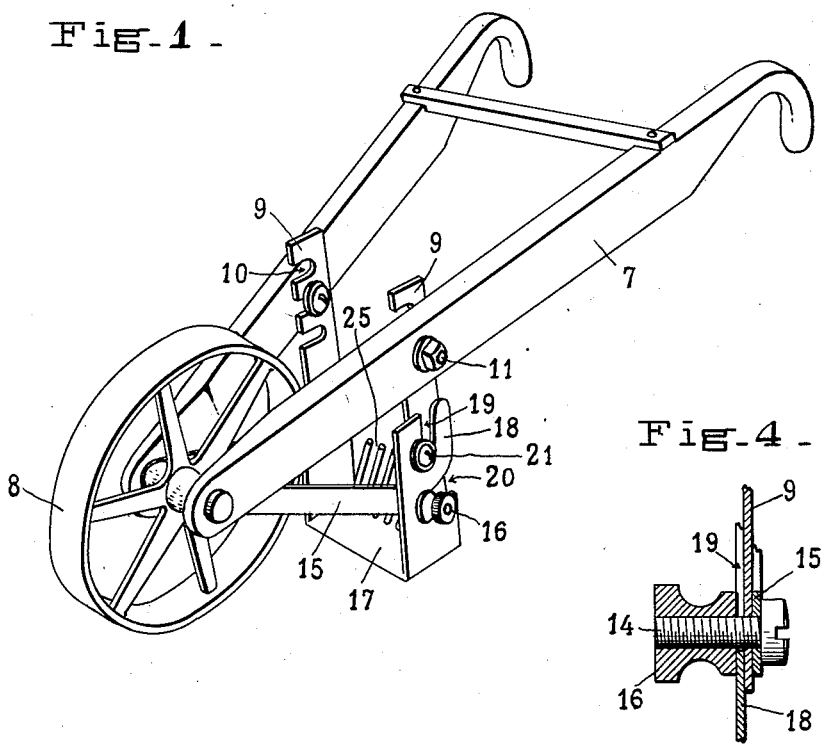
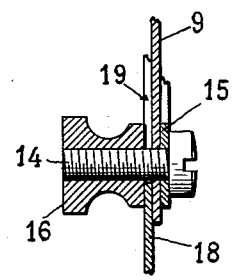
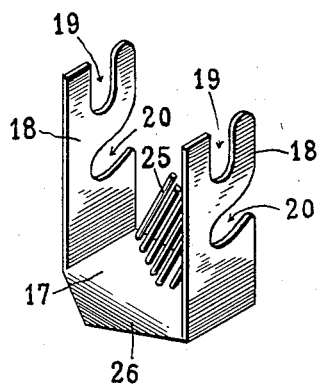
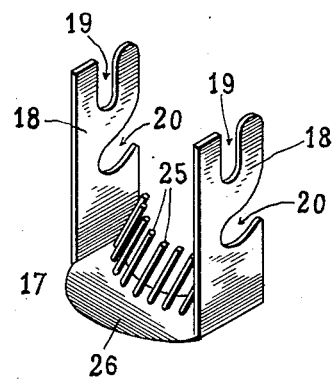
WITNESSES
INVENTOR
Frank Harris
BY Wilson Kent
ATTORNEYS

UNITED STATES PATENT OFFICE.

FRANK HARRIS, OF WILMINGTON, OHIO.

CULTIVATOR.

1,094,437.  Specification of Letters Patent.  Patented Apr. 28, 1914.

Application filed August 16, 1911. Serial No. 644,458.

*To all whom it may concern:*

Be it known that I, FRANK HARRIS, residing at Wilmington, in the county of Clinton and State of Ohio, have invented certain new and useful Improvements in Cultivators, of which the following is a specification.

This invention relates to cultivators or the like agricultural implements, and has for one of its objects to provide such a device in which there is a considerable range of adjustability as to certain of the parts.

Another object of the invention is to provide a device of the class referred to in which certain of the operative parts are very readily assembled with and detached from other of the parts.

Another object is to provide an agricultural device in the nature of a cultivator in which the member engaging the ground may be readily adjusted and held firmly in any adjusted position.

Still another object is to provide a device of the kind mentioned which is particularly effective for the performance of its agricultural or related function, and which may comprise a single or a double wheeled device, or may be used without a wheel, if desired.

Other objects and aims of the invention, more or less broad than those stated above, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which I have shown a merely illustrative embodiment of the invention: Figure 1 is a perspective view of a device constructed in accordance with the provisions of this invention. Fig. 2 is a detail perspective of a modified form of one of the elements of my invention. Fig. 3 is a view similar to Fig. 2 of another modified form of one of the parts included in the invention; and Fig. 4 is a sectional elevation partly broken away, illustrating the relations and connections of certain parts.

Referring to the numerals on the drawings, 7 indicates in a general way the main frame of a wheeled cultivator which exemplifies the sort of agricultural implement in connection with which the invention may be used, said frame including converging side pieces, between the ends of which is a wheel 8, journaled in the side pieces in any usual or preferred manner.

The numeral 9 indicates a pair of preferably flat supporting bars, each of which is secured at the inner sides of the side pieces of the main frame. As shown, the bars 9 may be provided with a plurality of slots or cut out portions 10, whereby said bars may be adjustably secured to the side pieces of the main frame, as by means of clamping bolts 11 passing through the side pieces of the frame and engaging in said slots or cut out portions, the bars being held in proper relation between the side pieces of the frame and nuts 12 which engage the bolts 11. The bars 9 extend below the frame of the device to any proper extent, and at their lower ends are apertured for pivotal engagement with bolts 14, which are rigidly secured at one end, respectively, of other bars 15, whose other ends are pivoted upon the axle of the wheel 8, preferably on opposite sides of said wheel between the wheel and the forward ends of the side pieces of the main frame. The engagement between the bolts 14 and the bars 9 is maintained by means of nuts 16 threaded upon said pins, whereby to form clamping bolts, adapted also to clamp other parts of the device in adjusted relation, as will be described.

The bars 9 and 15 may be considered as comprising a secondary frame which is adjustably connected to the main frame and adapted, in turn, to directly and adjustably support the cultivator member proper 17, as follows: I prefer that the member 17 shall take substantially the form shown in the drawings, where it appears as a U-shaped part, which may be readily made of a single piece of material, the connecting part of the U-member being preferably flat and having flat arms 18 bent up therefrom, the flat arms 18 being provided at their upper ends respectively with cut out portions or slots 19, and likewise provided in one of their side edges respectively with cut out portions or slots 20. In the assembled device the slots 19 are engaged over pins 21 on the bars 9, which pins are preferably headed, as shown; and the slots 20 arranged substantially concentric with the inner ends of the slots 19 engage the bolts 14 of bars 9 and 15, so that the member 17 may be held in adjusted relation between the bars 9 and the nuts 16 which are threaded upon the bolts 14. With the structure described it is evident that the cultivator member 17 is angularly adjustable with respect to the suporting bars 9, about the pins 21 as pivots, the nuts 16 on the bolts 14 being adapted to be tightened at any point along the length of the slots 20. The bars 9 being adjustable with relation to the main frame of the machine, it is evident that member 17 may be adjusted vertically.

The slots 19 extend longitudinally of the arms 18, at the upper ends of said arms, and the upper ends of said slots are open so that the arms may be detached from engagement with the pins 21 by merely sliding the arms downwardly so that the pins ride freely out of the open ends of the slots. The slots 20 extend from points below the slots 19, transversely of the arms 18, and their other end is open through the marginal edges of said arms so that the arms may be detached from engagement with the clamping members 14 by merely swinging said arms about the pins 21 as pivots to cause the clamping members 14 to ride free of the open end of the slots 20. It will thus be seen that the cultivator member 17 may be bodily detached from the secondary frame by merely loosening the clamping members and swinging said cultivator member so as to detach first the slots 20 from the clamping members and subsequently the slots 19 from the pins 21. While the slots 20 have been described as being substantially concentric with the inner ends of the slots 19 it is apparent that it is unnecessary to accurately shape the slot 20 for the reason that any variation from concentric relation with the inner end of the slot 19 will be readily accommodated by movement of the pins 21 along the length of the slots 18.

I prefer that the member 17 shall be provided with a plurality of teeth 25, upstanding from the flat piece connecting the side arms 18. These teeth are preferably slightly inclined rearwardly, as shown, and are disposed in a straight line, as shown in Fig. 1, or they may be arranged on a curved line, or on angularly arranged straight lines meeting about midway between the side arms 18, as shown in Figs. 2 and 3 respectively. In any event, the result is that the earth which passes between the arms 18 is sifted through the teeth. If desired, I may extend the connecting piece between the arms 18 forwardly and downwardly, as shown in Figs. 2 and 3, and this forward extension indicated by the numeral 26, may be curved or tapered as shown.

The use and operation of the device is believed to be clear from the foregoing description of parts and relations, and any further explanation is omitted as superfluous.

While I have shown and described the clamps, for retaining the bars 9 in adjusted relation to the main frame, and also the clamps for retaining the cultivator proper in adjusted relation to the secondary frame; to comprise simple bolts having nuts threaded thereon, it will be understood that I may employ any other suitable form of clamp which may be found best adapted or of most convenient operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which as a matter of language, might be said to fall therebetween.

Having thus described my invention, what I claim as new and desire to secure by Letters Patent, is:

1. In a device of the class described, a frame, and a cultivator member detachably and pivotally adjustable carried thereby, a clamping bolt on the frame for engaging the cultivator member, a pivot pin for the cultivator member carried by said frame, a substantially vertically projecting arm on the cultivator member formed with a longitudinally extending slot therein adapted to engage said pivot pin, said arm being also formed with a second slot adapted to be engaged by the clamping bolt, said second slot being arranged so as to be engaged by said clamping bolt at any point in the length of the second slot, and both of said slots being open-ended so that the cultivator member may be easily and bodily detached from said pivot pin and from said clamping bolt, substantially as described.

2. In a device of the class described, the combination with a main frame, a vertically adjustable secondary frame pendent therefrom, of a cultivator member detachably and pivotally adjustable carried by the secondary frame so as to be vertically adjustable therewith, a clamping bolt carried by the secondary frame for engaging the cultivator member, a pivot pin for the cultivator member also carried by the secondary frame, a substantially vertically projecting arm on said cultivator member formed with a longitudinally extending slot therein at its upper end adapted to engage the pivot pin, said arm being also formed with a second slot through which the clamping bolt projects, said second slot extending transverse to the plane of the longitudinal axis of the first slot having a portion of its length spaced below the lower end of the first slot, and the remainder of its length being substantially concentric to the lower end of the first slot, the clamping bolt engaging the wall of the second slot at any point in the length thereof to maintain the lower end of the first mentioned slot substantially in engagement with the pivot pin, and both of said slots being open-ended through the marginal edges of said vertical arm, so that the cultivator member may be easily bodily detached from said pivot pin nd from said clamping bolt, substantially as described.

In testimony whereof I have affixed my signature in the presence of two witnesses.

FRANK HARRIS.

Witnesses:
 CHAS. A. HARRIS,
 JOE T. DOAN.